United States Patent Office 3,481,170
Patented Dec. 2, 1969

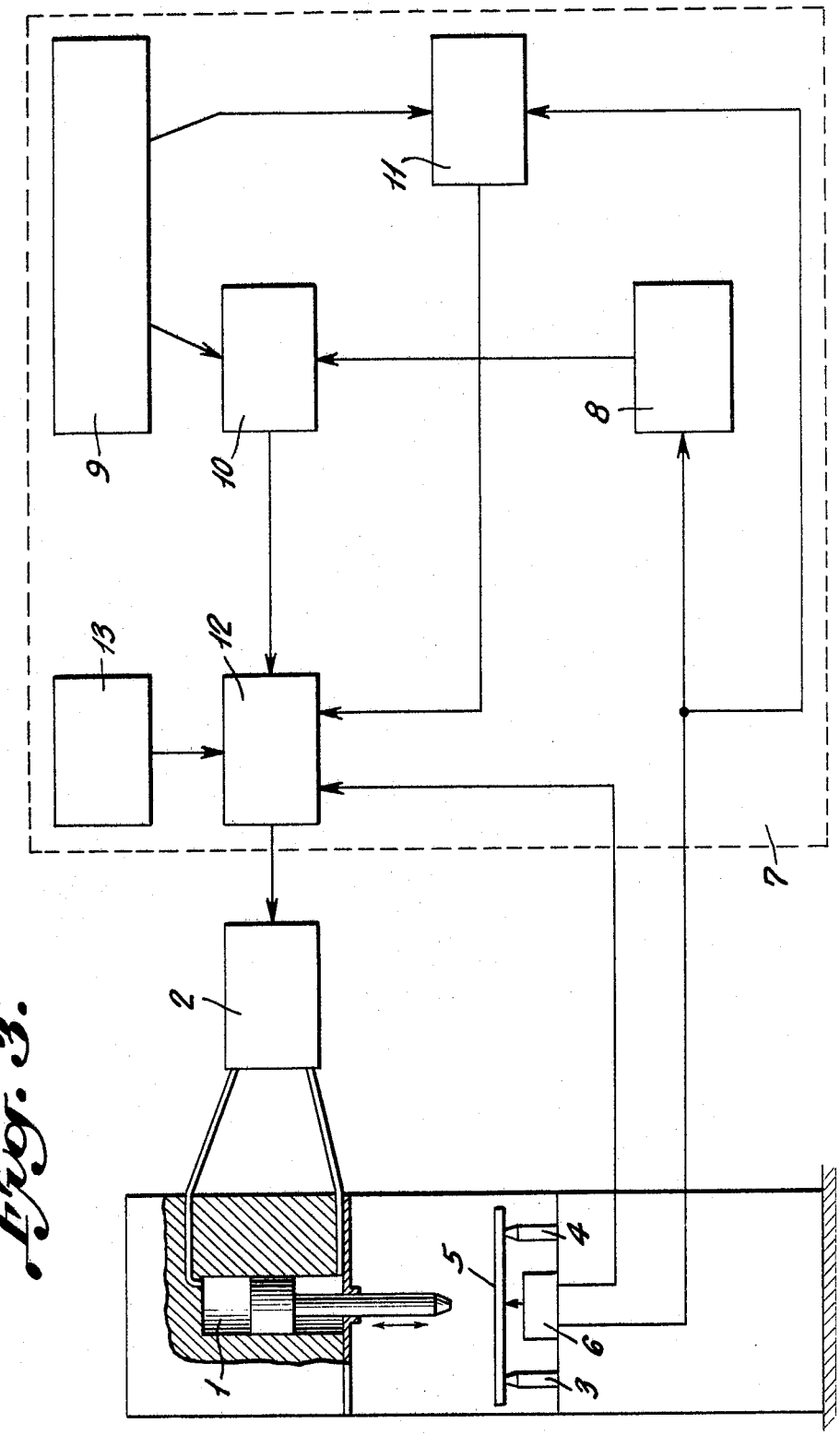

3,481,170
METHOD AND APPARATUS FOR STRAIGHTENING ELONGATED PIECES
Renzo Galdabini, Via Ivrea 1, Gallarate, Italy
Filed Aug. 4, 1967, Ser. No. 658,451
Claims priority, application Italy, Aug. 6, 1966,
18,307/66
Int. Cl. B21d 1/00
U.S. Cl. 72—8          6 Claims

ABSTRACT OF THE DISCLOSURE

A machine for precision straightening elongated, generally straight workpieces, including a pair of spaced fulcrums, a press means including a head to contact the workpiece between the fulcrums and capable of applying stress to the workpiece in a path normal to the line of absolute straightness to bend the workpiece between the two fulcrums, the press head being capable of precise positioning along its path of movement. A measuring means to measure the remaining distance from the line of absolute straightness between the pair of fulcrums to the position of the workpiece after a previous preliminary bending stress has been applied and removed, and means cooperating between the measuring means and the press means to develop a command signal for the press whereby a succeeding further stroke of the press means will move the head to a position beyond its previous movement a distance equal to the last measured remaining distance. And also the method of straightening elongated elements by first impressing a preliminary bending stress to an out-of-straight portion of an elongated piece, measuring the remaining deflection after the preliminary bending stress has been relaxed, and again bending the piece by deflecting it a distance beyond the position to which it was deflected under the preliminary bending stress equal to the remaining deflection after the bending stress has been relaxed.

---

The necessity of carrying out straightening operations on elongated work pieces, such as shafts and spindles, is very well known. Such pieces usually suffer longitudinal deformations due to the thermal treatment and other reasons. Such deformations are easily measured with a deformation pick-up which allows determination of the error of eccentricity, i.e. the deflection from the ideal straight position.

The straightening process in itself consists in applying to the piece a number of successive deformations opposing the initial deflection, in order to reduce the final deflection at least approximately to zero. This operation is normally done on a special type of hydraulic press, called "straightening press," which allows the operator to control, at each pressing stroke, the amount of deformation imparted to the piece.

Nevertheless, the problem of straightening remains industrially difficult because the operator must proceed by an empiric method since he does not know exactly the characteristic curve between force and deformation. Furthermore, this curve differs from one piece to the other, even within the same manufacturing run, because of variations of the material and of the thermal treatment.

It is an object of this invention to indicate a procedure which eliminates this difficulty, and allows the execution in a minimum of time and with high accuracy the straightening of elongated pieces, even if the characteristics of the material are known only approximately. Among these characteristics the elastic deflection is important, which is the deflection that can be imparted to the working piece without any part of it exceeding the elastic limit and thus entering into the plastic range.

Another object of this invention is to indicate a preferred apparatus for realizing this method on an industrial basis.

Figure 1:
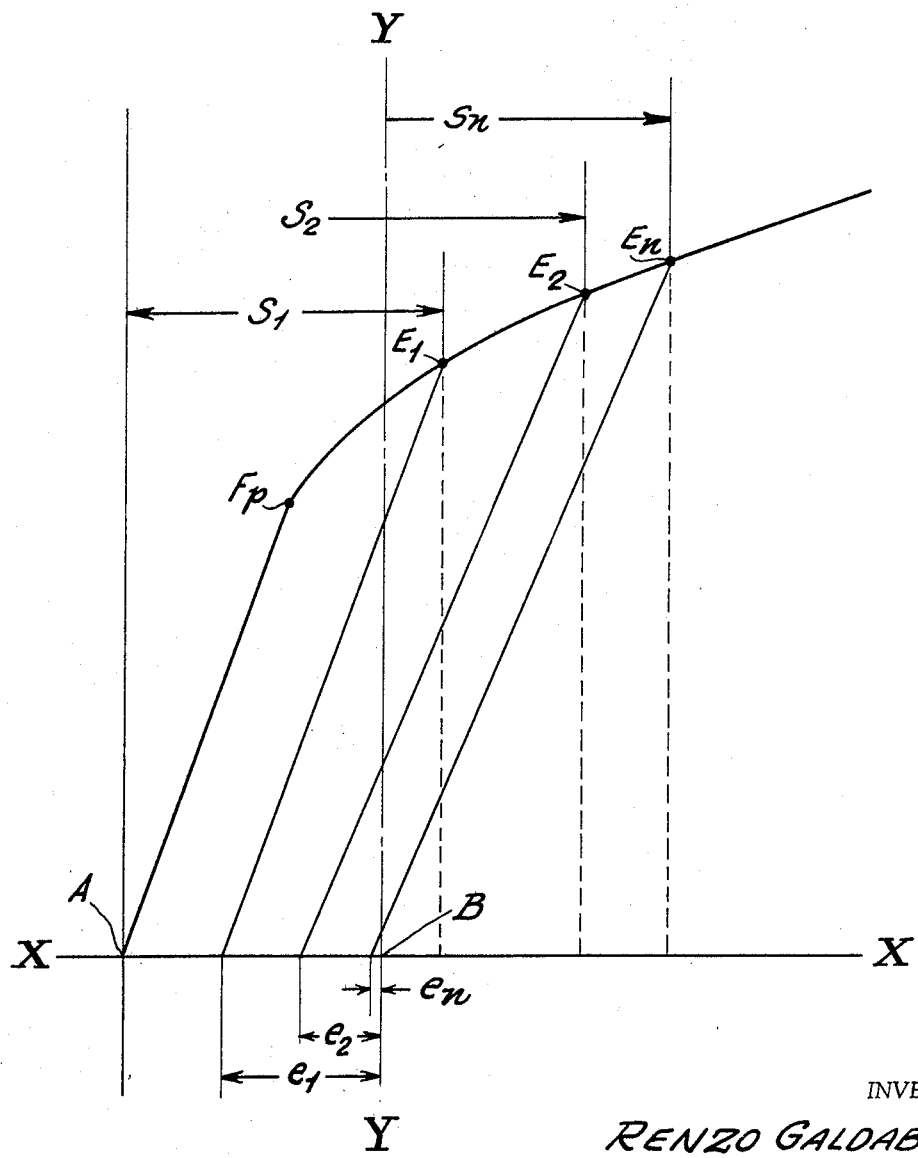
Figure 2:
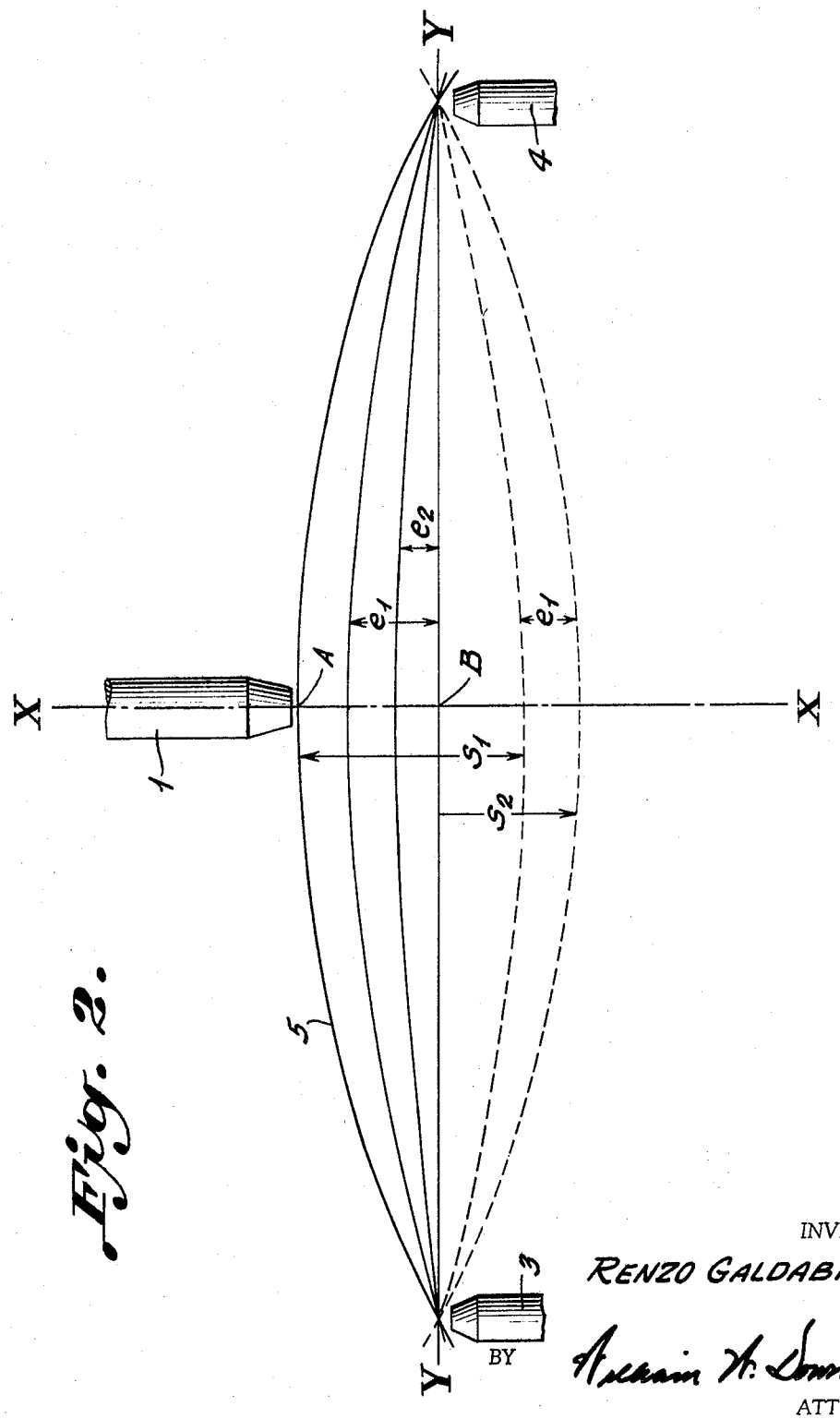

The method and apparatus are illustrated in the attached drawings in which like characters of reference refer to the same element, point or dimension in the several views, and in which:

FIGURE 1 is a stress strain graph showing the application of the theory of the present invention, FIGURE 2 is a diagrammatic view of a piece being straightened showing the application of the method of the present invention, and FIGURE 3 is a diagrammatic view of an automatic machine to automatically straighten elongated workpieces.

According to the present invention, the method consists in applying a first stroke $S_1$ as by a ram 1 to deflect the workpiece 1 from its deformed point A (FIGS. 1 and 2) normally beyond the completely straight position B by an amount to slightly exceed the elastic deflection limit $F_p$ to a point $E_1$ which has been previously approximately determined so as to partly straighten the piece. Then, the load will be released and the remaining eccentricity $e_1$ of the partially straightened piece will be measured as by a micrometer measuring device 6, and a second stroke $S_2$ is applied to give a deflection beyond the completely straight line to a position $E_2$ which lies beyond the position $E_1$ by a distance $e_1$. Continuing the process, the load will be released and the second residual eccentricity $e_2$ measured, and then optionally a successive stroke or strokes may be applied as required, dependent on the residual eccentricity and the allowable tolerance, giving the piece at each stroke an amount of $e_{(n-1)}$, until the remaining error $e_n$ will be smaller than a predetermined tolerance.

According to an alternative, the method can be simplified, even with only a small sacrifice of accuracy, by assuming for $e_1$, $e_2$, $e_n$ a constant average value which has been determined beforehand. That is, once $e_1$ is determined for each piece of a plurality of pieces, it may be assumed that the values of $e_2 \ldots e_n$ will be similar in each case.

The apparatus for producing the method according to this invention comprises a straightening press of the type having an accurately controllable stroke, supports for the elongated piece, at least one position pick-up to measure the total deflection applied to the piece by the press and for measuring the remaining deflection after release of the load. This position pick-up can produce corresponding signals which enter into a control device for the press movement, as explained.

The above means preferably comprise an electronic programmer which, after the feeding of the necessary information about the elastic deflection and of the permitted final error, conveys a control signal to an electro-hydraulic power means for the press. It is preferable, however, to have a servo-amplifier for giving the control signal defining the deformation that the press is to apply at each stroke according to this method.

Alternatively, it is possible to use hydraulic or pneumatic means and devices for carrying out the present straightening method.

An example of the practical implementation of the method according to this invention is shown on the accompanying drawing.

The apparatus comprises a straightening press 1 powered by an electro-hydraulic power means 2, two supports 3 and 4 for the work piece 5 to be straightened, a position pick-up 6 to measure the deflection of the work piece and an electronic control device 7 including a computer with digital memory 8, a programmer 9, a summing device 10 and a differentiator 11, and a control amplifier 12 with an external panel for starting etc. 13.

After feeding into the programmer 9 the proportional deflection $Fp$ which is determined from the known or assumed modulus of elasticity of the material of the work piece and the final error or tolerance $En$, the machine is set in operation by pressing a starting button by which an electric signal is generated from the panel 13 for the start of the operation. The position pick-up 6 produces two signals, one of them giving the total deflection $Fo$ going to the amplifier 12, while the other one relative to the final error $E_1 - E_2 \ldots En$ goes to the memory of the computer 8. After computing the sum of the different residual errors $E_1 + E_2 + \ldots En$ the corresponding signal goes to the summing device 10 which adds the proportional deflection $Fp$ and produces a control signal $(Fp + E_1 + E_2 \ldots + En)$. This control signal enters the control amplifier 12, the output of which goes to the electro-hydraulic power means 2 which, in turn, commands the press 1 at each stroke.

The actual operation consists of a number of strokes, the length of each being determined by the method of this invention. The operation comes to an end when the final error $Fn$, sent through the derivation device 11 and through the amplifier 12 to the programmer, is smaller than the tolerance fed before-hand.

The novel effect of this straightening method is obtained by the interaction between the position pick-up 6, the electronic control device 7 and the press 1, 2, 3, 4 itself. It is very useful because it makes it possible to obtain a very high degree of precision with a minimum number of strokes and without rejects.

It will be understood that there are many possibilities, other than the example described, of carrying out the straightening method according to this invention. In particular, the interconnection between the different apparatus and devices included in the control device 7 of the figure can be made in a different way without changing the essence of this method.

What is claimed is:

1. In a method for straightening an elongated piece, the steps of applying a first straightening stroke to bend the piece beyond the completely straight position, said bending being such as to stress the piece slightly beyond the elastic deflection limit to impart a preliminary permanent straightening deformation and at least one further stroke, imparting a bending by deflecting the elongated piece a distance equal to the sum of the first stroke, and the deflection from the straight position remaining after the preceding stroke.

2. In combination, a press of the type used to straighten elongated workpieces comprising a ram, means to move said ram accurately through predetermined distances and to predetermined positions, control means for said means to move said ram means connected to said control means to cause an initial movement of said ram to cause said workpiece to be initially deflected toward its desired final deflection under a force slightly higher than the limit for elastic deflection of the workpiece, position sensing means to measure the deflection of the workpiece from perfect straightness, signal means actuated by said position sending means, means actuated by said signal means to measure and remember the remaining deflection of the workpiece from perfect straightness after each stroke of the ram, and a control device actuated by said signal means operatively connected to said means to move said ram to add as an increment of movement to each successive stroke of the ram a distance equal to the deflection of the workpiece from perfect straightness of the workpiece remaining after the preceding strokes of said ram.

3. The combination of claim 2, in which said control device includes a programmer connected to said position sensing means, and means to measure the deflection of the workpiece after each stroke of the ram with a preselected deflection tolerance connected to said programmer so that the operation of the ram will be stopped when the deflection of the workpiece after a stroke of the ram is less than said preselected deflection tolerance.

4. A machine for precision straightening of generally straight elongated workpieces, said machine comprising:

a pair of spaced fulcrums and reciprocating press means midway between said fulcrums to impart a bending stress to the workpiece, said press means including control means to accurately determine the length of stroke of each successive stroke of said reciprocating press means, measuring means to measure the remaining deflection of the workpiece midway between said fulcrums from a plane passing through said fulcrums after each successive stroke of said press, and means interconnecting said measuring means to said control means to add a distance corresponding to said measured remaining deflection after each stroke of said press means to the length of stroke of the next successive stroke of said press means.

5. A method of improving the straightness of a generally straight workpiece, the steps of supporting an out-of-straight portion of the workpiece by two spaced fulcrums with the out-of-straight portion bowing away from the straight line connecting the fulcrums, moving a pressing device against said out-of-straight portion between said fulcrums to a predetermined position to impart stress to bend said out-of-straight portion slightly beyond said straight line to impart a preliminary straightening deformation to said out-of-straight portion, moving said pressing device to relieve the stress on said out-of-straight portion, measuring the distance remaining between the out-of-straight portion and said straight line after the stress has been relieved, then again pressing said out-of-straight portion by movement of the pressing device against the out-of-straight portion to a position beyond said predetermined position a distance equal to the measured distance remaining between the out-of-straight portion and said straight line.

6. The method of claim 5 including repeating the steps recited in claim 5 a plurality of times and each successive movement of the pressing device being considered as the movement to impart the preliminary straightening deformation.

References Cited

UNITED STATES PATENTS

| 3,333,445 | 8/1967 | Mergler et al. | 72—389 |
| 3,335,587 | 8/1967 | Blachut et al. | 72—10 |

RONALD D. GREFE, Primary Examiner

U.S. Cl. X.R.

72—11